United States Patent
Griffin et al.

(10) Patent No.: US 12,260,224 B2
(45) Date of Patent: Mar. 25, 2025

(54) SIZING SERVICE FOR CLOUD MIGRATION AWAY FROM ONLY CLOUD STORAGE AND BACK TO ON-SITE COMPUTING STRATEGY

(71) Applicant: Red Hat, Inc., Raleigh, NC (US)

(72) Inventors: Leigh Griffin, Waterford (IE); Andrea Cosentino, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 183 days.

(21) Appl. No.: 17/940,475

(22) Filed: Sep. 8, 2022

(65) Prior Publication Data
US 2024/0086203 A1 Mar. 14, 2024

(51) Int. Cl.
*G06F 9/44* (2018.01)
*G06F 9/50* (2006.01)
(Continued)

(52) U.S. Cl.
CPC .............. *G06F 9/44* (2013.01); *G06F 9/5061* (2013.01); *H04L 41/0803* (2013.01); *H04L 67/10* (2013.01)

(58) Field of Classification Search
CPC . G06F 9/44; G06F 9/5061; H04L 8/03; H04L 67/10
See application file for complete search history.

(56) References Cited

U.S. PATENT DOCUMENTS 8,234,377 B2 7/2012 Cohn
10,445,134 B2 10/2019 Borthakur
(Continued)

FOREIGN PATENT DOCUMENTS

JP 7028906 B2 3/2022

OTHER PUBLICATIONS

Sahoo, Asit, "Reverse Cloud Migration," www.locuz.com/us/blog-details/Reverse-Cloud-Migration, Aug. 25, 2021, 3 pages.
(Continued)

*Primary Examiner* — Tammara R Peyton
(74) *Attorney, Agent, or Firm* — Dority & Manning, P.A.

(57) ABSTRACT

A computing device receives data related to operation of a cloud computing environment having an application comprising several services. The data related to operation of the cloud computing environment can include time-based data related to computing resource use in the cloud computing environment, such as I/O rate, processor utilization, and others. In some implementations the services that compose the application can be orchestrated through an orchestrator, and in those implementations data regarding the orchestration can also be provided to the computing device. The computing device can also request service-related information from the cloud computing environment, where the service-related information can include financial related information for operations in the cloud. The computing device can take as input the data related to operation of the application and services the orchestration, and the service and thereafter provide a recommendation of an on-premises computing infrastructure adequate to replace the cloud computing environment.

20 Claims, 7 Drawing Sheets

(51) Int. Cl.
  *H04L 41/0803*   (2022.01)
  *H04L 67/10*    (2022.01)

(56) References Cited

U.S. PATENT DOCUMENTS

| | | |
|---|---|---|
| 10,452,430 B2 | 10/2019 | Maskalik et al. |
| 10,467,049 B2 | 11/2019 | Tarasuk-Levin et al. |
| 11,240,170 B1 | 2/2022 | Suit |
| 11,327,675 B2 * | 5/2022 | Swamy ................. G06F 3/0607 |
| 11,398,989 B2 * | 7/2022 | Herle .................... H04L 67/104 |
| 11,601,464 B2 * | 3/2023 | Viswanathan .......... G06F 21/12 |
| 2020/0285975 A1 | 11/2020 | Suparna et al. |

OTHER PUBLICATIONS

Author Unknown, "Moving a VM Back On-Premises," cloud.google.com/migrate/compute-engine/docs/4.8/how-to/vm-operations/running-a-vm-back-on-premises, first accessed Aug. 9, 2022, 4 pages.

* cited by examiner

SIZING SERVICE FOR CLOUD MIGRATION AWAY FROM ONLY CLOUD STORAGE AND BACK TO ON-SITE COMPUTING STRATEGY

BACKGROUND

Cloud computing has been and continues to be adopted for computing resource needs by businesses. Some businesses may also operate on-premises computer hardware infrastructure.

SUMMARY

The examples disclosed herein implement a service to aid in migrating from a cloud computing environment to an on-premises computer infrastructure.

In one example a method is provided. The method includes receiving, by a computing device comprising a processor device, an application profile that identifies computing device resource usage of a plurality of services that compose an application that executes in a cloud computing environment. The method further incudes based on the application profile, determining a computing resource configuration of a computing system suitable for executing the application. The method further includes outputting information that identifies the computing resource configuration of the computing system suitable for executing the application.

In one example a computing device is provided. The computing device includes a memory and a processor device coupled to the memory. The processor device is to receive an application profile that identifies computing device resource usage of a plurality of services that compose an application that executes in a cloud computing environment. The processor device is also to, based on the application profile, determine a computing resource configuration of a computing system suitable for executing the application. The processor device is also to output information that identifies the computing resource configuration of the computing system suitable for executing the application.

In one example a computer program product is provided. The computer program product is stored on a non-transitory computer-readable storage medium and includes executable instructions to cause a processor device to receive an application profile that identifies computing device resource usage of a plurality of services that compose an application that executes in a cloud computing environment. The instructions further cause the processor to, based on the application profile, determine a computing resource configuration of a computing system suitable for executing the application. The instructions further cause the processor to output information that identifies the computing resource configuration of the computing system suitable for executing the application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Cloud computing services provide on-demand availability for computing resources such as storage and computing power without the attendant cost of direct active management of those resources. In contrast to cloud computing, on-premises computing requires the acquisition and use of physical computing resources on the physical premises. Some distinct advantages of cloud computing over on-premises computing include real-time scalability, on-demand storage, and automated backups, all without the need to maintain physical hardware. Customers of cloud computing services that have migrated one or more aspects of their business computing needs to the cloud do so precisely for these reasons and others.

In some situations, however, migrating away from a cloud environment and back to on-premises computing is desired.

For example, in some business enterprises the changing nature of privacy laws as well as other regulatory pressures can encourage the active adoption of an on-premises computing strategy. Just as the world has witnessed an understandable migration toward cloud computing services and away from on-premises computing for the advantages the cloud offers, migrating away from a cloud computing environment and back to on-premises computing, at least in some instances, remains an area of interest.

The examples described herein address migrations away from a cloud computing service to a physical machine that is capable of running it. Any variety of system architectures/configurations can be migrated from the cloud, including those that use container management tools to provide container orchestration. Accordingly, in one particular aspect, examples described herein address migrations from a cloud implementation of a highly distributed containerized workload to an on-premises physical machine. It will be appreciated, however, that implementations that do not rely upon containers can nevertheless still be migrated from the cloud to on-premises physical machine. Migrations can be made to a single physical machine, or a multitude of machines such as a data center.

As described in various implementations herein, migration from the cloud to on-premises occurs through the use of a Right Size Machine Service (RSMS) which takes as input several key pieces of information that represent operation of the cloud computing environment desired to be migrated, and then recommends physical machine(s) needed to replicate such services on-premises. The RSMS is capable of evaluating the complex operational environment of the cloud and determining an adequate physical architecture suitable to replace a cloud implementation. Examples of information used as input to the RSMS include: metadata such as pod information from the container orchestration services; resource monitoring metrics; and pod autoscaler history. As this information might be contained in multiple cloud/cluster environments, multiple inputs may be received from various orchestration services. The RSMS can furthermore aggregate input from multiple pod environments. Inputs received by the RSMS can be used to ascertain a base level of CPU, RAM and physical storage needed for both base level expectations as well as scalability expectations when the system comes under load. The RSMS can be executed in a recursive manner over a period of time to refine its base level and scalability expectations.

A computing device that implements the RSMS includes a rules-based system to derive, based on the inputs, the physical requirements of an on-premises machine(s) as well as actions to be taken based on the occurrence of operating event. As an example, the computing device implementing the RSMS can recommend co-processing hardware profiles needed for on-premises machine(s) if high CPU usage is routinely experienced in the cloud environment; or the computing device can recommend on-premises machine(s) with RAID like storage capabilities that could be scheduled if high disk space is required in the cloud environment; or the computing device can recommend prioritization and shutdown of non-essential services during spikes of high RAM utilization that were observed in the cloud environment.

Figure 1:
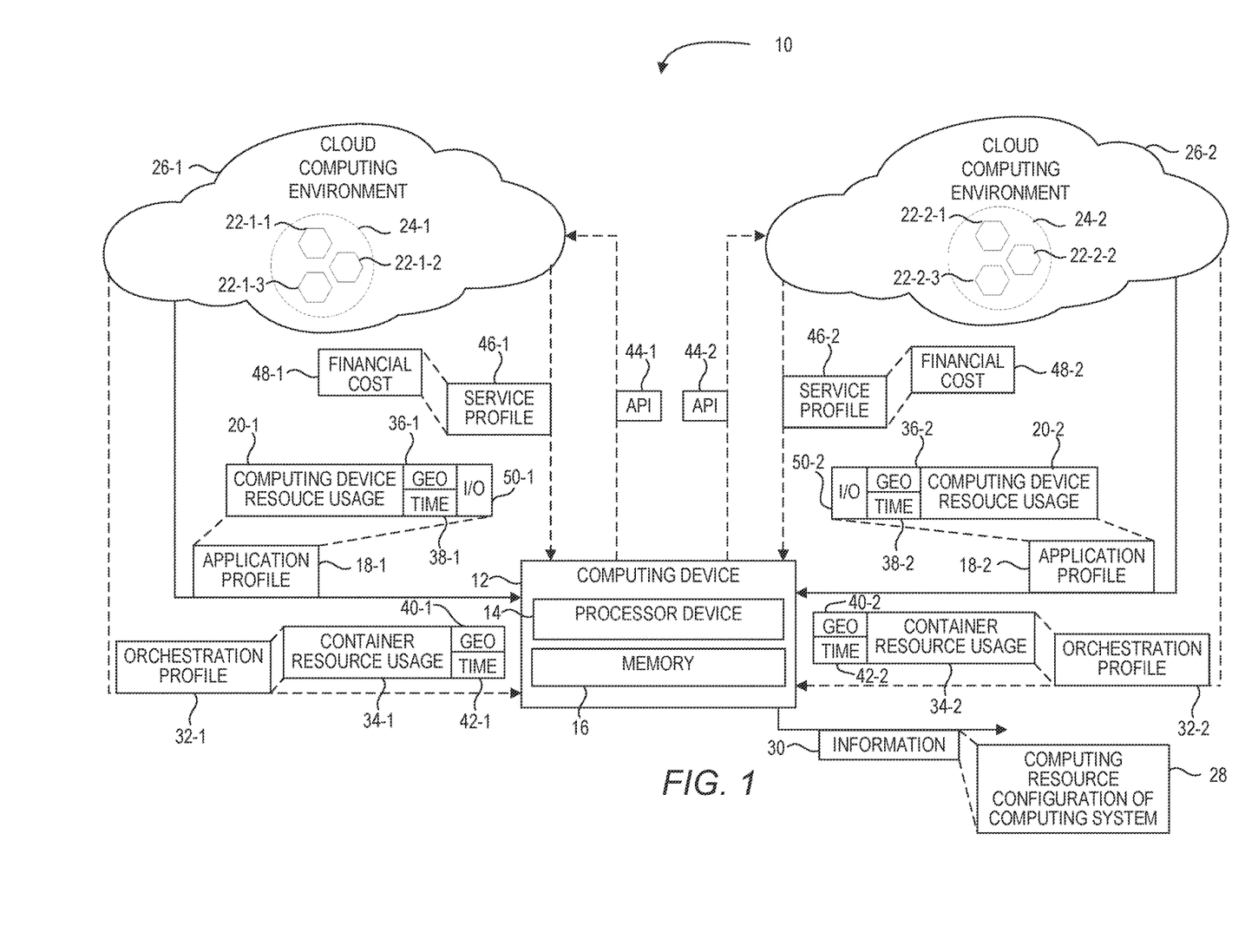
FIG. 1 is a block diagram of an environment suitable for a sizing service for cloud migration to physical machine according to one implementation.

FIG. 1 is a block diagram of an environment 10 in which examples disclosed herein may be practiced. The environment 10 includes a computing device 12 having a processor device 14 and a memory 16. Although only one processor device 14 and memory 16 are depicted, other implementations of the computing device 12 can include additional processor devices 14 and/or memories 16. The memory 16 includes instructions that, when executed by the processor device 14, cause the computing device 12 to receive data from the cloud computing environment 26-1 and 26-2 and determine a physical machine requirement to migrate operations of the applications 24-1 and 24-2 operating in the respective cloud environments 26-1 and 26-2 to an on-premises physical machine.

FIG. 1 depicts two separate cloud computing environments 26-1 and 26-1, each having their own application 24-1 and 24-2 comprising, respectively, services 22-1-1 to 22-2-3. Although the figure depicts two cloud computing environments 26-1 and 26-2 in use with the computing device 12, it will be understood by the discussion herein that the computing device 12 will function equally well with just a single cloud computing environment, whether it be 26-1 or 26-2. Furthermore, it will also be understood by the discussion herein that the computing device 12 can be used with additional cloud computing environments in addition to the two cloud computing environments 26-1 and 26-2 depicted in the illustrated figure. It will therefore be appreciated that the implementations of the computing device 12 depicted herein can be operated with just a single cloud computing environment, or multiple cloud computing environments 26-1 and 26-2. Thus, the computing device 12 can be operated in conjunction with data received from any number of the cloud computing environments 26 having a mix of the services 22 that compose any number of the applications 24.

The application in any given cloud computing environment can be the same or different relative to the application in another cloud computing environment. The same is true for the services within any given application. In some cloud computing environments one or more of the services may be the same or different than the service(s) found in another of the cloud computing environments. Thus, in some implementations the application 24-1 in the cloud computing environment 26-1 can, but need not, be the same as the application 24-2 in the cloud computing environment 26-2. Likewise, the service 22-1-1 in the application 24-1 of the cloud computing environment 26-1 can, but need not, be the same as the service 22-2-1 in the application 24-2 of the cloud computing environment 26-2.

It will be appreciated from the discussion above that the cloud computing environment 26-1 can include similar features and variations as those discussed above with respect to the cloud computing environment 26-2. A discussion follows immediately below of the architecture and operation of the cloud computing environment 26-1, and its passage of information of its operation to the computing device 12. Reference will therefore be made with respect to the cloud computing environment 26-1 and related aspects, but it will be appreciated that the same description can also be applied to the cloud computing environment 26-2 and related aspects. No limitation is implied or intended that the discussion below be limited to just the cloud computing environment 26-1, and rather that the description limited to the cloud computing environment 26-1 is for ease of convenience only and is equally applicable to the cloud computing environment 26-2.

The application 24-1 in the cloud computing environment 26-1 includes several services 22-1-1 to 21-1-3 in the illustrated implementation. In performing the functions of the application 24-1, the services 22-1-1 to 22-1-3 represent small independent services that can be coupled to one another to form the application 24-1. Such coupling of small independent services can take a variety of forms including those known as microservices and miniservices. The services 22-1-3 to 22-1-3 can be communicatively coupled with each other to achieve the functions of the application 24-1 using any variety of techniques, including via application program interfaces (API), to set forth just one non-limiting example. The services 22-1-1 to 22-1-3 can be executed in harmony with each other using any variety of techniques, including those that use choreography and/or those that use orchestration. To set forth one non-limiting example, the services 22-1-1 to 22-1-3 can be structured to operate with asynchronous messaging using pub\sub messaging as might be used in a choreography implementation. In addition to or in lieu of choreography, orchestration services can also be used in some implementations to achieve the functions of the application 24-1 by actively controlling the order of operation of the services 22-1-1 to 22-1-3 using an orchestrator. In those forms using orchestration, some implementations can use containerized services 22-1-1 to 22-1-3. In the orchestration environment it will be appreciated that any number of clusters, having any number of nodes, using any number of pods can be implemented herein.

No matter the configuration of the services 22-1-1 to 21-1-3 in the application 24-1, the cloud computing environment 26-1 is structured to collect operating statistics of application 24-1 and/or its constituent services 22-1-1 to 22-1-3 as it is executed in response to user demands. As will be appreciated, a user of cloud services can request execution of the application 24-1. In those instances in which a number of users are requesting execution of the application 24-1, the cloud computing environment 26-1 can provide multiple instances of the application 24-1. The so-called 'scaling' of the application 24-1 can be provided automatically by the cloud computing environment 26-1 (i.e., 'auto-scaling') to meet changing demand from the plurality of users requesting execution of the application 24-1. The cloud computing environment 26-1, in turn, collects computing device resource usage 20-1 pertaining to execution of the application 24-1, and in some forms can also collect computing device resource usage 20-1 of the individual services 22-1-1, 22-1-2, and 22-1-3. Resource usage data collected can include any variety of data such as auto-scaler time history, peak demand of the application 24-1, average demand of the application 24-1 over a period of time, number of users requesting use of the application 24-1 as a function of time, time to execution of the application 24-1, Input/Output (I/O) rate during execution of the application 24-1, and memory usage per service 22-1-1 to 22-1-3, to set forth just a few non-limiting examples. I/O rate as used herein can be expressed as input/output operations per second (IOPS), which in some forms is related to a number of reads and writes operations per second. IOPS can be measured as either total IOPS, random read IOPS (average number of random read I/O operations per second), random write IOPS (average number of random write I/O operations per second), sequential read IOPS (average number of sequential read I/O operations per second), and sequential write IOPS (average number of sequential write I/O operations per second). Any use of I/O rate herein as it relates to data measured in the cloud computing environment 26-1 includes any or all of the aforementioned I/O operations.

The cloud computing environment 26-1 collates the computing device resource usage into an application profile 18-1 that can be made available to the computing device 12. The application profile can include any variety of data useful to describe operation of the application 24-1 and/or the services 22-1-1 to 22-1-3 across the cloud computing environment 26-1, including those referenced above. The application profile 18-1 can be made available by the cloud computing environment 26-1 over any suitable network using any suitable protocol, and can be provided in real time, at update intervals in near real-time, or in bulk historical form, among any other suitable delivery. In some forms the application profile 18-1 is pushed to the computing device 12 for display to a user (e.g., the computing device 12 is connected to the cloud computing environment 26-1 via a web socket), while in still others the application profile 18-1 is pulled to the computing device 12 upon request (e.g., the computing device 12 requests the application profile 18-1 via an API call). The application profile 18-1 can be consumed by other processes within the computing device 12 to discern trends, identify problems in the application 24-1, or otherwise be used to evaluate the performance of the cloud computing environment 26-1.

Upon receipt of the application profile 18-1, the computing device 12 is configured to determine, based on the application profile 18-1, a computing resource configuration 28 of a computing system suitable for executing the application. As mentioned above, such a determination can take as input data from the application profile that represent aspects of the cloud computing environment that are desired to be migrated to an on-premises machine(s). The computing device 12 is then used to determine the hardware and/or services needed to replicate the cloud computing services on-premises. The computing resource configuration 28 is therefore an indication of a suitable computing system to migrate cloud operations of the application 24-1 to on-premises hardware and/or services. The computing device 12 can use any suitable technique for determining the computing resource configuration 28. For example, the computing device 12 can use a rules based heuristic algorithm to provide a recommendation of suitable hardware required to replace the cloud computing environment 26-1. Such a heuristic algorithm can operate on historical data of the application profile 18-1. A heuristic algorithm could also be applied in real time where output of the heuristic algorithm could be collected over a span of time and from which historical trends and outliers in the heuristic algorithm can be used to determine the computing resource configuration 28. In other forms the computing device 12 can determine the computing resource configuration 28 by applying machine learning/artificial intelligence to historical data of the application profile 18-1.

One non-limiting example of determining the computing resource configuration 28 includes evaluating I/O hard drive time histories of the application 24-1 in the cloud computing environment 26-1 and identifying a type of drive suitable in the on-premises context to replicate the cloud-based computing. Such a determination of a type of hard drive can include a hard disk drive or solid-state drive. The computing resource configuration 28 can also include a storage configuration type, including but not limited to RAID storage, logical volume management (LVM) storage virtualization, etc., among potential others. In some implementations the computing device 12 can further determine a make and model of a type of drive. For example, the computing device 12 can, based on the application profile 18-1, further determine that a particular manufacturer with a particular model number of hard drive is suitable. Such an implementation can compare an evaluation of the application profile 18-1, which may result in a minimum level of storage requirements required to satisfy the computing resource configuration 28, against information held in a table for comparison purposes. The table may include line items related to any of a storage type, storage limits, I/O rates (any or all of the IOPS mentioned above), manufacturer, and model number.

A search of the table, using the computing resource configuration 28, can result in the identification of one or more line items that satisfy the configuration 28. In further implementations, the computing device 12 can, based on the application profile 18-1, recommend multiple manufacturers and multiple model numbers. In determining the computing resource configuration 28 based on the application profile 18-1, the computing device 12 can further assign a score to the computing resource configuration 28 and can tier the computing resource configuration 28. For example, in some implementations the computing device 12 can assign a high score to a first computing resource configuration associated with a drive type that guarantees performance over 100% of the time span of analyzed application profile 18-1, with a medium score to a second computing resource configuration associated with a drive type that guarantees performance over 75% of the time span of the analyzed application profile 18-1.

After determining the computing resource configuration 28, the computing device 12 can further output information 30 that identifies the computing resource configuration 28 of the computing system suitable for executing the application 24-1. The information 30 can be output using any variety of forms, including electronic display on a monitor or suitable screen, or printed reports. The information that identifies the computing resource configuration 28 can include a variety of fields, including CPU speed, memory size, network bandwidth and latency, hard drive storage, and hard drive I/O, among potential others. In some forms the information 30 can include recommendation of specific hardware brand and model numbers. The information can include a rating associated with each of the recommendations, with the rating being associated with the score mentioned immediately above as it relates to a hardware configuration that meets a certain performance requirement. Such a performance requirement can include an expected performance over a time period of the application profile 18-1, such as but not limited to the entire time period, or a fraction of the time period.

Although as suggested above the description of features and aspects of the cloud computing environment 26-1 is applicable to like reference numerals in cloud computing environment 26-2, a few specific examples are also worth noting. In operation the computing device 12 can also receive a second application profile 18-2 that identifies a second computing device resource usage 20-2 of a plurality of second services 22-2-1 to 22-2-3 that compose a second application 24-2 that executes in a second cloud computing environment 26-2. As above, the application profile 18-2 can be made available by the cloud computing environment 26-2 over any suitable network using any suitable protocol, and can be provided in real time, at update intervals in near real-time, or in bulk historical form, among any other suitable delivery. In some forms the application profile 18-2 is pushed to the computing device 12 (e.g., the computing device 12 is connected to the cloud computing environment 26-2 via a web socket), while in still others the application profile 18-2 is pulled to the computing device 12 upon request (e.g., the computing device 12 requests the application profile 18-2 via an API call). The application profile 18-2 can be consumed by other processes within the computing device 12, just as with the application profile 18-1, to discern trends, identify problems in the application 24-2, or otherwise be used to evaluate the performance of the cloud computing environment 26-2.

The application profile received by the computing device 12 can include in one implementation a plurality of the application profiles 18-1 and 18-2 from a plurality of the cloud computing environments 26-1 and 26-2, wherein the plurality of services 22-1-1 to 22-1-3 and 22-2-1 to 22-2-3 is hosted across the plurality of the cloud computing environments 26-1 and 26-2. FIG. 1 depicts the application profiles 18-1 and 18-2 received by the computing device 12, but in some implementations the computing device 12 may communicate with the single cloud computing environment 26-1 which sends its application profile. Such a result may occur in a coordinated cloud environment in which communication is shared between the environments, but one cloud computing environment is responsible for reporting an application profile indicative of both cloud computing environments. Another non-limiting example includes a multi-cloud orchestration environment.

The computing device 12 can also receive from the cloud computing environment 26-1 an orchestration profile 32-1 that identifies a container resource usage 34-1 of a plurality of containers (any one or more of services 22-1-1 to 22-1-3 can be containerized) that execute in the cloud computing environment 26-1. In those instances in which services 21-1-1 to 21-1-3 are not orchestrated, the orchestration profile 32-1 may of course not be provided. The services 21-1-1 to 21-1-3 can be orchestrated using any suitable orchestrator, including but not limited to Kubernetes. Kubernetes is an open-source system used to deploy, scale, and mange containerized applications. Not all implementations of the services 21-1-1 to 12-1-3 need to be configured as a containerized service. Other orchestrators that operate on the basis of non-containerized services are available as well, including Nomad, also an open-source utility. If the services 21-1-1 to 21-1-3 are containerized, container instances of one or more of the services 22-1-1 to 22-1-3 can be realized using any suitable container software platform. As will be understood, containers are lightweight, and include all of the necessary elements to run in any environment. One non-limiting example of a software platform for building applications that include services in the form of containers is Docker, an open-source platform.

Based on the orchestration profile 32-1, the computing device 12 can further determine the computing resource configuration 28 of the computing system suitable for executing the application. In those instances in which the cloud computing environment 26-1 uses the containerized services 22-1-1 to 22-1-3 with Kubernetes as an orchestrator, several useful metrics related to the orchestration are available from the cloud computing environment 26-1. Container resource usage 34-1 related to the metrics of interest include items such as node resource usage, number of nodes, number of running pods per node, as well as memory and CPU requests and limits are available for inspection. Each of these metrics can be collated and provided in the orchestration profile 32-1 received by the computing device 12 from the cloud computing environment 26-1. The orchestration profile 32-1 can be made available by the cloud computing environment 26-1 over any suitable network using any suitable protocol, and can be provided in real time, at update intervals in near real-time, or in bulk historical form, among any other suitable delivery. In some forms the orchestration profile 32-1 is pushed to the computing device 12 (e.g., the computing device 12 is connected to the cloud computing environment 26-1 via a web socket), while in still others the orchestration profile 32-1 is pulled to the computing device 12 upon request (e.g., the computing device 12 requests the orchestration profile 32-1 via an API call). The orchestration profile 23-1 can be consumed by other processes within the computing device 12, to discern trends, identify problems in the application 24-1, or otherwise be used to evaluate the performance of the cloud computing environment 26-1.

Regardless of the type of form and frequency of data update, the container resource usage 34-1 is used by the computing device 12 to determine the computing resource configuration 28 of a suitable computing system to migrate from the cloud computing environment 26-1 to on-premises physical hardware and services. The computing device 112 can be used to convey the container statistics in the information 30 without any further evaluation in those cases in which orchestration is also preferred in the on-premises physical machine intended to provide comparable services to the cloud computing environment 26-1. In other implementations in which the containerized services 22-1-1 to 22-1-3 are not contemplated in the migration, the computing device 112 can be used to determine a physical machine in an on-premises environment that can provide a similar level of service. Such determination can include an output of disk and memory utilization sufficient to meet the demands placed upon the cloud computing environment 26-1 by the number of users and instances of the application 24-1.

The application profile 18-1 can include at least one of a time history usage data 36-1 and a geographic usage data 38-1, and wherein the orchestration profile 32-1 includes at least one of a time history usage data 40-1 and a geographic usage data 42-1. As will be appreciated, data related to resource usage (whether it be related to the application profile 18-1 or the orchestration profile 32-1) collected by the cloud computing environment 26-1 as it relates to time can be provided to the computing device 12 as a total statistic(s) representative of a defined period of time, or can be collected and provided to the computing device 12 as a function of time using any variety of time increments. With respect to geographic usage data, the cloud computing environment 26-1 may include computing resources distributed at a variety of strategic locations typically close to a high density of users so as to reduce communication latencies. Thus, data related to the resource usage (whether it be related to the application profile 18-1 or orchestration profile 32-1) collected by the cloud computing environment 26-1 as it relates to geography can be provided to the computing device 12 by geographic location of the cloud resource that provides execution of the application 24-1. For example, geographic data collated relative to the application profile 18-1 from a first geographic region of the cloud computing environment 26-1 may differ from a second geographic region. In these instances the computing device resource usage 20-1 provided to the computing device 12 can be segregated into the first and second geographic regions. Such information may be useful when the move to on-premises infrastructure in the form of a private cloud which also provides geographic specific services to its distributed users.

In some forms the computing device 12 can be capable of querying, through an application program interface 44-1, a web resource of the cloud computing environment for a service profile 46-1 of the cloud computing environment 26-1, the service profile 46-1 including a financial cost 48-1 associated with the plurality of services 22-1-1 to 22-1-3 of the cloud computing environment 26-1. Though the illustrated implementation depicts an API call from the computing device 12 to the cloud computing environment 26-1, other communication types are also contemplated (e.g., web scraping details from a webpage of the provider of the cloud computing environment 26-1). The financial cost 48-1 of the service profile 46-1 can include pricing details provided by the provider of the cloud computing environment 26-1. Pricing can include details such as rates for storage or computational processing, pricing related to time of day, and pricing related to geographic location. Details related to pricing provided in the service profile 46-1 can be used to assist in the determination of the computing resource configuration 28. The computing device 12 can use pricing to assist in comparing a potential hardware solution for on-premises computing infrastructure with that of the cloud computing environment 26-1.

In some implementations, the computing device resource usage includes I/O rate 50-1 (any or all of the IOPS mentioned above, for example) for a storage service of the cloud computing environment 26-1. The I/O rate can include the maximum I/O rate over a period of time or can include a time history of I/O rate.

Figure 2:
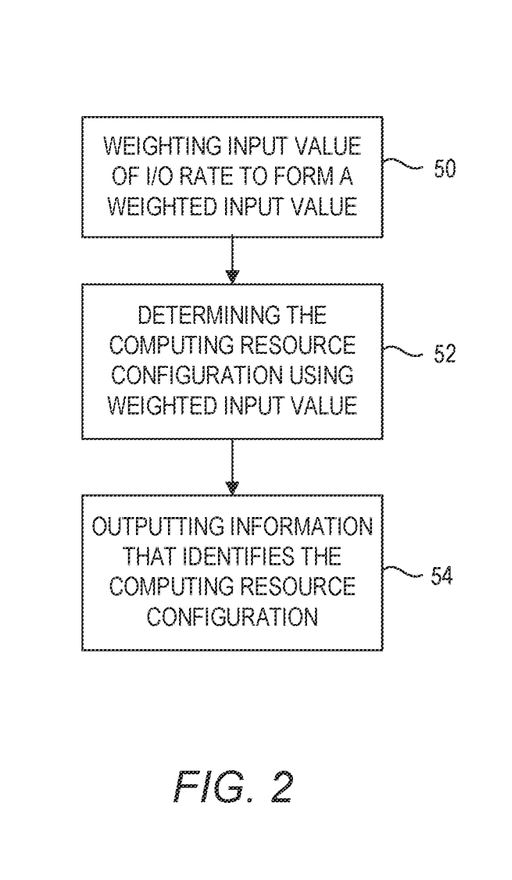
FIG. 2 is a flow chart for a method to practice an aspect of one implementation.

Turning now to FIG. 2, and with continued reference to FIG. 1, when determining the computing resource configuration 28, the computing device 12 further uses as input a weighted value of I/O rate at step 50. When the computing device 12 is determining the computing resource configuration 28 at step 52, it may be useful to weight any variety of the data available in the application profile 18-1, the orchestration profile 32-1, and/or the service profile 46-1. The ability to weight certain details permits the end user the ability to emphasis certain data and/or de-emphasizing others in those implementations where differences in the values of certain data fields impacts the final computing resource configuration 28. In some forms the computing device 12 may be configured to determine the computing resource configuration that accounts for, say, 20% higher I/O rate (any or all of the IOPS rates mentioned above) than is present over a time period of the application profile. The ability to add a factor of 1.2 to the I/O rate data in the application profile 18-1 builds in a performance margin.

The computing resource configuration can include a recommendation for type of hard drive as discussed hereinabove with respect to determining the computing resource configuration 28 as in step 54. Such recommendation of type of hard drive can be made by, for example, comparing I/O rates (any or all of the IOPS mentioned above) to a table of hard drive types and I/O rates associated with each type of hard drive type in the table. An algorithm could be used to select the best hard drive type to provide the most margin, or the closest hard drive type which provides a higher I/O rate than the I/O rate measured in the cloud computing environment 26-1.

Figure 3:
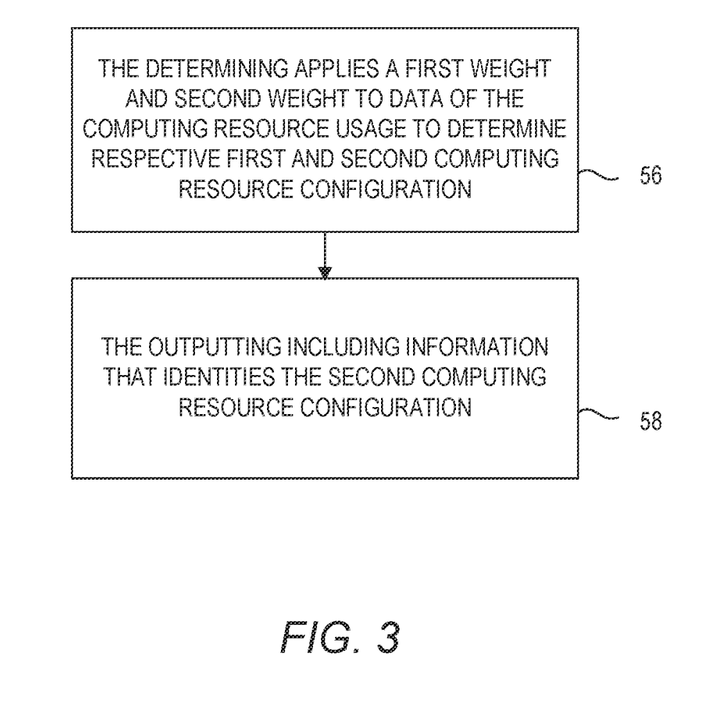
FIG. 3 is a flow chart for a method to practice an aspect of one implementation.

Turning now to FIG. 3 and with continued reference to FIG. 1, when the computing device 12 determines the computing resource configuration 28, it can do so by applying a first weight to a data of the computing device resource usage to determine the computing resource configuration, and wherein the determining is structured to apply a second weight to the data of the computing device resource usage to determine a second computing resource configuration as shown in step 56. Similar to the above, the ability to apply a variety of weights to different aspects of the data used by the computing device 12 can lead to a greater confidence in the computing resource configuration 28 output by the computing device 12. Further, as shown in step 58, the outputting includes information that identifies the second computing resource configuration. Such an ability to separately analyze the information 30 output from the computing device 12 provides an end user with a better understanding of the type of hardware and/or services required to meet or exceed a level of performance currently provided by the cloud computing environment 26-1.

Figure 4:
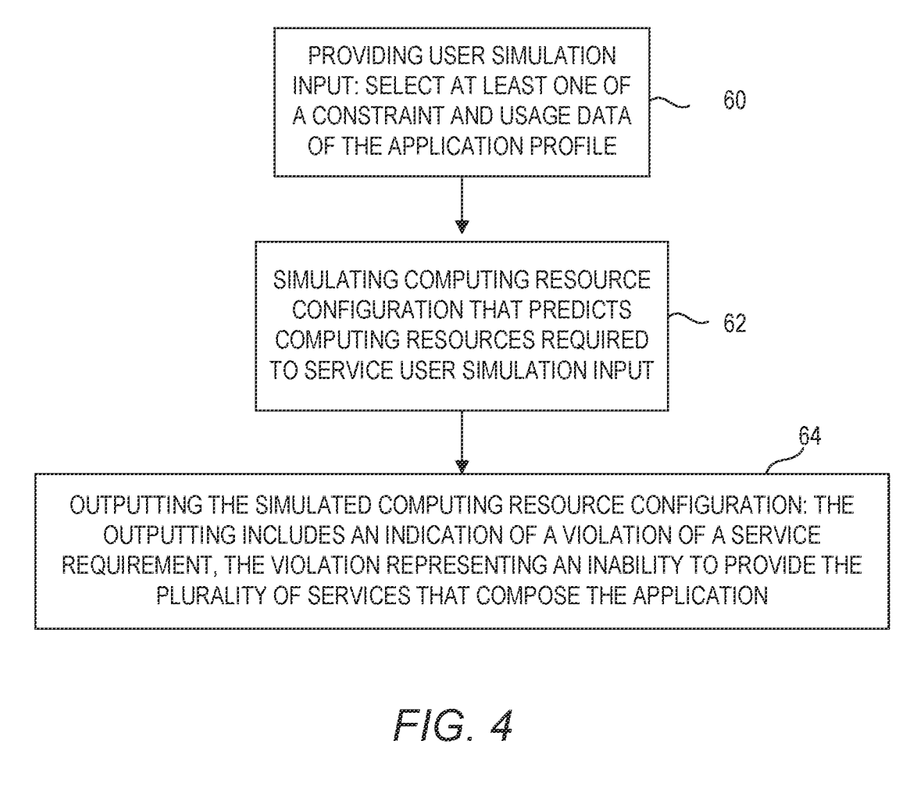
FIG. 4 is a flow chart for a method to practice an aspect of one implementation.

Turning to FIG. 4, and with continued reference to FIG. 1, a simulation input can be provided at step 60. In some implementations a user can select at least one of a constraint for use by the computing device 12 as it determines the computing resource configuration. A constraint can be, for example, a minimum IOPS of the I/O rate that is acceptable to the user of the computing device, perhaps a result of performing sensitivity studies and developing a sense of a level of risk in a hardware profile suggested in the computing resource configuration. The method of FIG. 4 is further used to simulate computing resource configuration 28 that predicts computing resources required to service user simulation input. In this way a user can simulate what hardware would be required to replace the cloud environment 26 and implement an on-premises physical architecture. The method then outputs the simulated computing resource configuration. In one form the outputting includes an indication of a violation of a service requirement, the violation representing an inability to provide the plurality of services that compose the application. Service requirements may include guaranteed uptime, a minimum duration of service disruption, etc.

Figure 5:
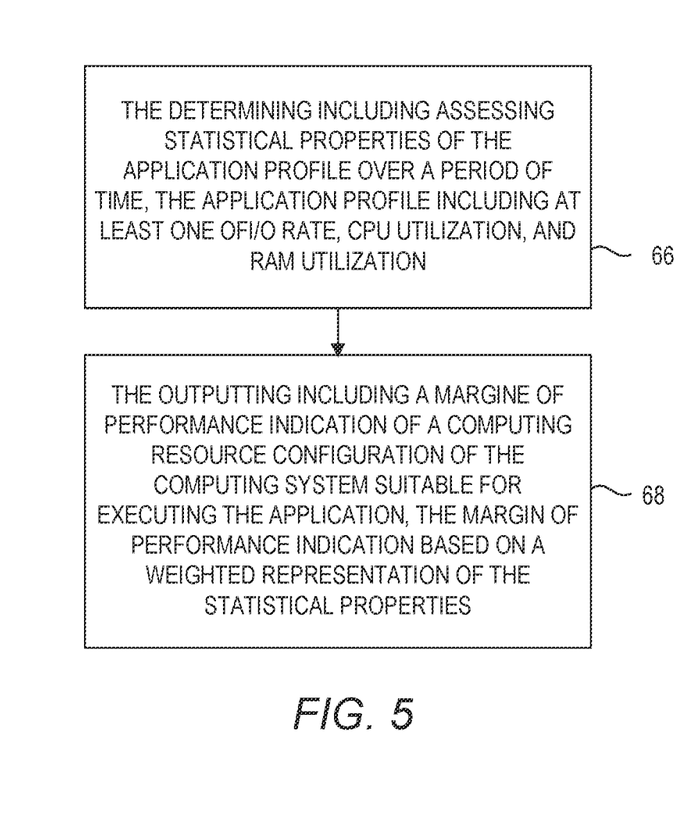
FIG. 5 is a flow chart for a method to practice an aspect of one implementation.

FIG. 5, with reference to FIG. 1, depicts an implementation of the instant application and further defines that the application profile 18-1 includes at least one of I/O rate, CPU utilization, and RAM utilization over a period of time. At step 66, the determining the computing resource configuration 28 including assessing statistical properties of the application profile 18-1 over the period of time. When the information 30 is output at step 68 from the computing device 12 it includes a margin of performance indication of the computing resource configuration 28 of the computing system suitable for executing the application 24-1, the margin of performance indication based on a weighted representation of the statistical properties. The ability to output, for a user to view, a margin of performance provides the user with a confidence in a future deployment and operation of an on-premises physical computing infrastructure.

Figure 6:
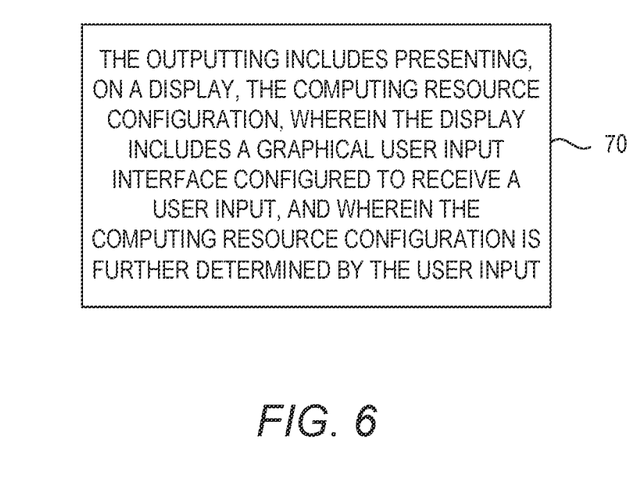
FIG. 6 is a flow chart for a method to practice an aspect of one implementation.

FIG. 6, along with FIG. 1, illustrates at step 70, that the outputting of the information 30 includes presenting, on a display, the computing resource configuration 28, and wherein the display includes a graphical user input interface configured to receive a user input, and wherein the computing resource configuration 28 is further determined by the user input. As above, the ability to for the user to interact with the computing device 12 and alter inputs to the computing device provides an ability to test a variety of cases to ensure a level of confidence in an on-premises infrastructure adopted based upon the computing resource configuration 28 output from the computing device 12.

Figure 7:
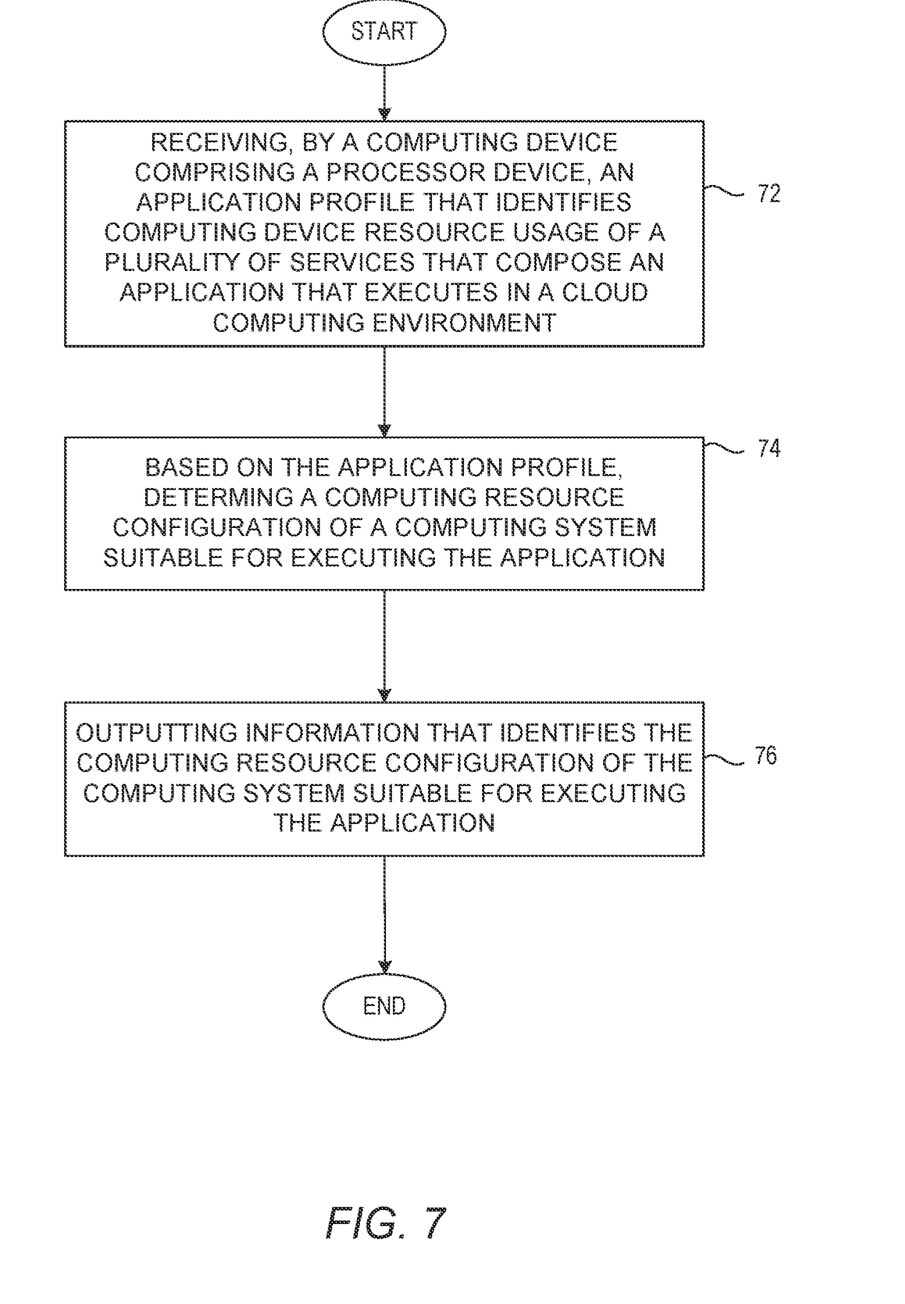
FIG. 7 is a flow chart for a method to practice a sizing service for cloud migration to physical machine according to one implementation.

FIG. 7 illustrates a method for practicing one implementation of the instant disclosure. FIG. 7 will be discussed in conjunction with FIG. 1. The method includes at step 72, receiving, by the computing device 12 comprising the processor device 14, the application profile 18-1 that identifies the computing device resource usage of the plurality of services 22-1-1 to 22-01-3 that compose the application 24-1 that executes in the cloud computing environment 26-1. Step 74 includes, based on the application profile, determining the computing resource configuration 20-1 of the computing system suitable for executing the application 24-1. Step 76 includes outputting the information 30 that identifies the computing resource configuration 28 of the computing system suitable for executing the application 24-1.

Figure 8:
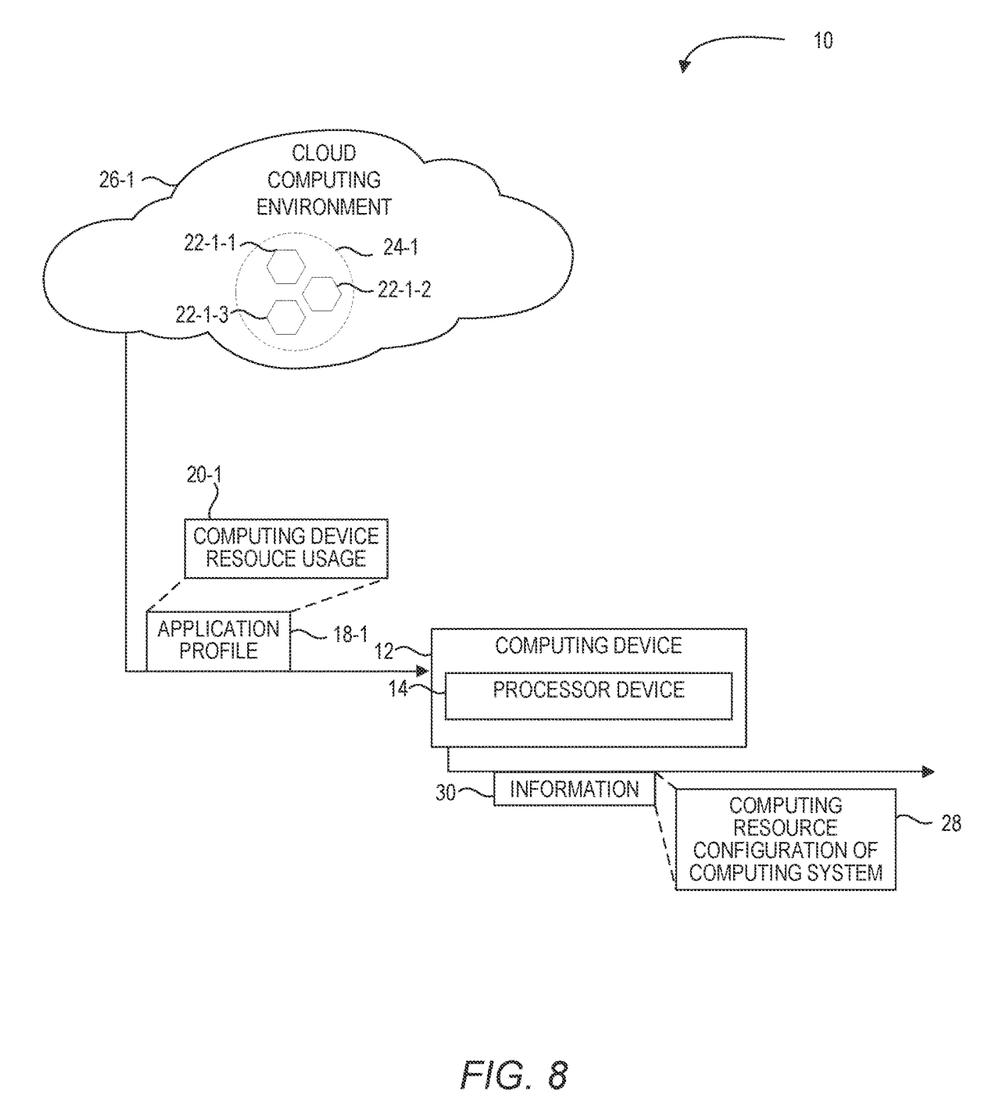
FIG. 8 is a simplified block diagram of the environment illustrated in FIG. 1 according to one implementation.

FIG. 8 illustrates a simplified block diagram of the environment 10 illustrated in FIG. 1 according to one implementation. The environment 10 includes the computing device 12 comprising the processor device 14. The processor device 14 is to receive the application profile 18-1 that identifies the computing device resource usage 20-1 of the plurality of services 22-1-1 to 22-1-3 that compose the application 24-1 that executes in the cloud computing environment 26-1. The processor device 14 is further to, based on the application profile 18-1, determine the computing resource configuration 28 of a computing system suitable for executing the application 24-1. The processor device 14 is further to output the information 30 that identifies the computing resource configuration 28 of the computing system suitable for executing the application 24-1.

Figure 9:
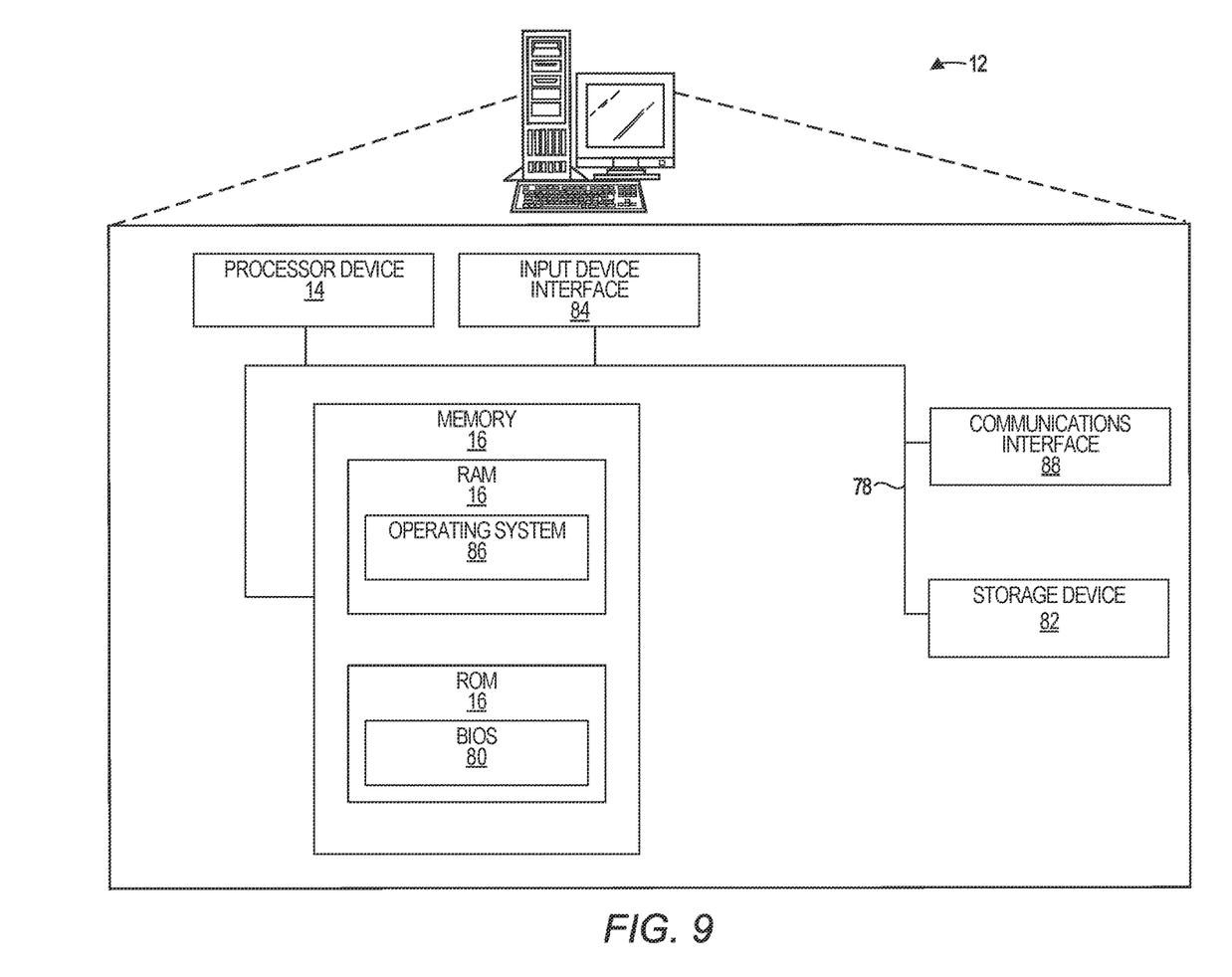
FIG. 9 is a block diagram of the computing device illustrated in FIG. 1 according to one implementation.

FIG. 9 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 78. The system bus 78 provides an interface for system components including, but not limited to, the memory 16 and the processor device 14. The processor device 14 can be any commercially available or proprietary processor.

The system bus 78 may be any of several types of bus structures that may further interconnect to a memory bus (with or without a memory controller), a peripheral bus, and/or a local bus using any of a variety of commercially available bus architectures. The memory 16 may include non-volatile memory 16(e.g., read-only memory (ROM), erasable programmable read-only memory (EPROM), electrically erasable programmable read-only memory (EEPROM), etc.), and volatile memory 16 (e.g., random-access memory (RAM)). A basic input/output system (BIOS) 80 may be stored in the non-volatile memory 16 and can include the basic routines that help to transfer information between elements within the computing device 12. The volatile memory 16 may also include a high-speed RAM, such as static RAM, for caching data.

The computing device 12 may further include or be coupled to a non-transitory computer-readable storage medium such as the storage device 82, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 82 and other drives associated with computer-readable media and computer-usable media may provide non-volatile storage of data, data structures, computer-executable instructions, and the like. A number of modules can be stored in the storage device 82 and in the volatile memory 16, including an operating system 86 and one or more program modules which may implement the functionality described herein in whole or in part. All or a portion of the examples may be implemented as a computer program product stored on a transitory or non-transitory computer-usable or computer-readable storage medium, such as the storage device 82, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14 may serve as a controller, or control system, for the computing device 12 that is to implement the functionality described herein.

An operator, such as the user, may also be able to enter one or more configuration commands through a keyboard (not illustrated), a pointing device such as a mouse (not illustrated), or a touch-sensitive surface such as a display device. Such input devices may be connected to the processor device 14 through an input device interface 84 that is coupled to the system bus 78 but can be connected by other interfaces such as a parallel port, an Institute of Electrical and Electronic Engineers (IEEE) 1394 serial port, a Universal Serial Bus (USB) port, an IR interface, and the like. The computing device 12 may also include the communications interface 88 suitable for communicating with the network as appropriate or desired. The computing device 12 may also include a video port configured to interface with the display device (e.g., a computer monitor), to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing device comprising a processor device, an application profile that identifies computing device resource usage of a plurality of services that compose an application that executes in a cloud computing environment;
   based on the application profile, determining a computing resource configuration of a computing system suitable for executing the application; and
   outputting information that identifies the computing resource configuration of the computing system suitable for executing the application.

2. The method of claim 1 further comprising:
   receiving, by the computing device, a second application profile that identifies a second computing device resource usage of a plurality of second services that compose a second application that executes in a second cloud computing environment.

3. The method of claim 1 wherein the application profile includes a plurality of application profiles from a plurality of cloud computing environments, wherein the plurality of services is hosted across the plurality of cloud computing environments.

4. The method of claim 1 further comprising:
   receiving, by the computing device, an orchestration profile that identifies container resource usage of a plurality of containers that execute in the cloud computing environment; and
   based on the orchestration profile, further determining the computing resource configuration of the computing system suitable for executing the application.

5. The method of claim 4 wherein the application profile includes at least one of a time history usage data and a geographic usage data, and wherein the orchestration profile includes at least one of time history usage data and geographic usage data.

6. The method of claim 1 further comprising querying, through an application program interface, a web resource of the cloud computing environment for a service profile of the cloud computing environment, the service profile including a financial cost associated with the plurality of services of the cloud computing environment.

7. The method of claim 1 wherein the computing device resource usage includes I/O rate for a storage service of the cloud computing environment, wherein the determining uses as input a weighted value of I/O rate, and wherein the computing resource configuration includes a recommendation for type of hard drive.

8. The method of claim 1 wherein the determining is structured to apply a first weight to a data of the computing device resource usage to determine the computing resource configuration, and wherein the determining is structured to apply a second weight to the data of the computing device resource usage to determine a second computing resource configuration, and wherein the outputting includes information that identifies the second computing resource configuration.

9. The method of claim 1 further comprising simulating, based on a user simulation input, a simulated computing resource configuration that predicts computing resources required to service the user simulation input, wherein the outputting information includes outputting the simulated computing resource configuration.

10. The method of claim 9 wherein the user simulation input includes at least one of a constraint and a usage data of the application profile, and wherein the outputting includes an indication of a violation of a service requirement, the violation representing an inability to provide the plurality of services that compose the application.

11. The method of claim 1 wherein the application profile includes at least one of Input/Output, CPU utilization, and RAM utilization over a period of time, the determining including assessing statistical properties of the application profile over the period of time, and the outputting including a margin of performance indication of a computing resource configuration of the computing system suitable for executing the application, the margin of performance indication based on a weighted representation of the statistical properties.

12. The method of claim 1 wherein the outputting includes presenting, on a display, the computing resource configuration, and wherein the display includes a graphical user input interface configured to receive a user input, and wherein the computing resource configuration is further determined by the user input.

13. A computing system, comprising:
   a memory; and
   a processor device coupled to the memory to:
      receive an application profile that identifies computing device resource usage of a plurality of services that compose an application that executes in a cloud computing environment;
      based on the application profile, determine a computing resource configuration of a computing system suitable for executing the application; and
      output information that identifies the computing resource configuration of the computing system suitable for executing the application.

14. The computing system of claim 13 wherein the processor device is further to: receive a second application profile that identifies a second computing device resource usage of a plurality of second services that compose a second application that executes in a second cloud computing environment.

15. The computing system of claim 13 wherein the processor device is further to:
   receive an orchestration profile that identifies container resource usage of a plurality of containers that execute in the cloud computing environment; and based on the orchestration profile, further determine the computing resource configuration of the computing system suitable for executing the application.

16. The computing system of claim 13 wherein the processor device is further to query, through an application program interface, a web resource of the cloud computing environment for a service profile of the cloud computing environment, the service profile including a financial cost associated with the plurality of services of the cloud computing environment.

17. A non-transitory computer-readable storage medium that includes executable instructions configured to cause a processor device to:
receive an application profile that identifies computing device resource usage of a plurality of services that compose an application that executes in a cloud computing environment;
based on the application profile, determine a computing resource configuration of a computing system suitable for executing the application; and
output information that identifies the computing resource configuration of the computing system suitable for executing the application.

18. The non-transitory computer-readable storage medium of claim 17 wherein the instructions further cause the processor device to:
receive a second application profile that identifies a second computing device resource usage of a plurality of second services that compose a second application that executes in a second cloud computing environment.

19. The non-transitory computer-readable storage medium of claim 17 wherein the instructions further cause the processor device to:
receive an orchestration profile that identifies container resource usage of a plurality of containers that execute in the cloud computing environment; and
based on the orchestration profile, further determine the computing resource configuration of the computing system suitable for executing the application.

20. The non-transitory computer-readable storage medium of claim 17 wherein the instructions further cause the processor device to query, through an application program interface, a web resource of the cloud computing environment for a service profile of the cloud computing environment, the service profile including a financial cost associated with the plurality of services of the cloud computing environment.

* * * * *